United States Patent [19]
Yano et al.

[11] Patent Number: 5,096,288
[45] Date of Patent: Mar. 17, 1992

[54] PROJECTION APPARATUS

[75] Inventors: Koutaro Yano, Yokohama; Nozomu Kitagishi, Hachioji; Tsunefumi Tanaka, Yokohoma, all of Japan

[73] Assignee: Canon Kabushiki Kaisha, Tokyo, Japan

[21] Appl. No.: 586,135

[22] Filed: Sep. 21, 1990

[30] Foreign Application Priority Data

| Sep. 19, 1989 [JP] | Japan | 1-251280 |
| Oct. 27, 1989 [JP] | Japan | 1-281225 |
| Oct. 27, 1989 [JP] | Japan | 1-281226 |

[51] Int. Cl.$^5$ ............................ G03B 21/14
[52] U.S. Cl. ................... 353/69; 353/30; 353/101; 352/114; 359/196
[58] Field of Search ............ 353/90, 69, 101, 31, 353/30; 350/6.4, 6.3, 6.2, 6.1, 420, 421; 352/114, 113, 105, 119

[56] References Cited

U.S. PATENT DOCUMENTS

| 1,199,460 | 9/1916 | Featherstone | 353/70 |
| 2,465,835 | 3/1949 | Becote | 352/113 |
| 2,795,996 | 6/1957 | Saver | 353/70 |
| 3,071,875 | 1/1963 | Herstreet | 353/70 |
| 3,253,505 | 5/1966 | Miller | 353/70 |
| 3,262,359 | 7/1966 | Carpenter | 353/69 |
| 3,597,059 | 8/1971 | Gopfert | 352/119 |
| 3,963,337 | 6/1976 | Lundberg | 353/70 |
| 4,089,599 | 5/1978 | Kuboshima | 353/DIG. 3 |
| 4,482,224 | 11/1984 | Johansson | 353/70 |

FOREIGN PATENT DOCUMENTS 63-52585  5/1988  Japan .

Primary Examiner—William A. Cuchlinski, Jr.
Assistant Examiner—William C. Dowling
Attorney, Agent, or Firm—Fitzpatrick, Cella, Harper & Scinto

[57] ABSTRACT

A projection display apparatus, which projects a magnified image onto a screen, comprises an image forming system, such as a display panel, a projector including a plurality of lenses for projecting the image onto the screen, and a decentering mechanism for decentering some lenses in the projector with respect to the optical axis. Even if the image is distorted by arrangement of the screen and the optical axis and so on, the distortion is compensated by decentering the lenses and producing a decentering distortion.

11 Claims, 5 Drawing Sheets

PROJECTION APPARATUS

BACKGROUND OF THE INVENTION

1. Field of the Invention

The present invention relates to a projection display apparatus which projects an image displayed on a display panel onto a screen with magnification by using a projection lens and which is suitable for obtaining a large image.

2. Related Background Art

The demand for a display on a large screen has recently increased, and projection displays can be watched in many places today. FIG. 8 shows the composition of a conventional projection display apparatus used in such places. Referring to FIG. 8, the projection display apparatus comprises an illumination optical system 1, a display panel 2, such as a liquid crystal light valve, a projection lens 3 and a screen 4. A large screen display is performed by illuminating an image formed on the display panel 2 by the illumination system 1 and projecting the image with magnification onto the screen 4 through the projection lens 3.

However, the above conventional apparatus has a disadvantage: when a bundle of rays from the projection lens 3 are obliquely projected onto the screen 4, that is, when the optical axis of the projection lens 3 is not perpendicular to the screen 4, trapezium distortion is caused by the influence of the tilt in the projected image. In particular, since the relative relationship between the screen and the projection lens varies in accordance with the situation, in reality, the screen and the projection lens are likely to be arranged such that the trapezium distortion is extremely noticeable.

On the other hand, Japanese Laid-Open Patent Application No. 63-52585 discloses that an image is projected onto a screen by decentering the whole projection lens in parallel. However, since the whole projection lens is decentered, the diameter of the whole projection lens is required to be sufficiently long, and the decentering amount of the image with respect to that of the lens, that is, the sensitivity, is comparatively small.

SUMMARY OF THE INVENTION

An object of the present invention is to provide a projection display apparatus to solve such problems of conventional apparatuses. In order to achieve this object, in the present invention, when an image on a display panel is projected by a projection lens onto a screen, the trapezium distortion is compensated by a compensating optical system and a drive means for driving the compensating optical system mounted to the projection lens.

DETAILED DESCRIPTION OF PREFERRED EMBODIMENTS

Figure 1:
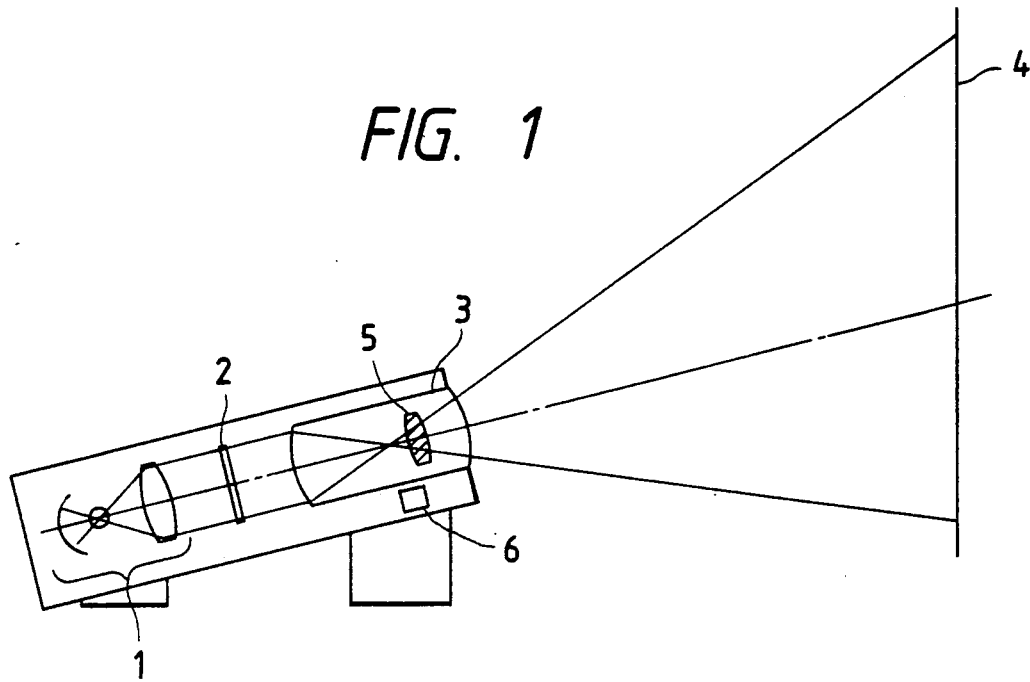
FIG. 1 is a view of a first embodiment of the present invention.
Figure 8:
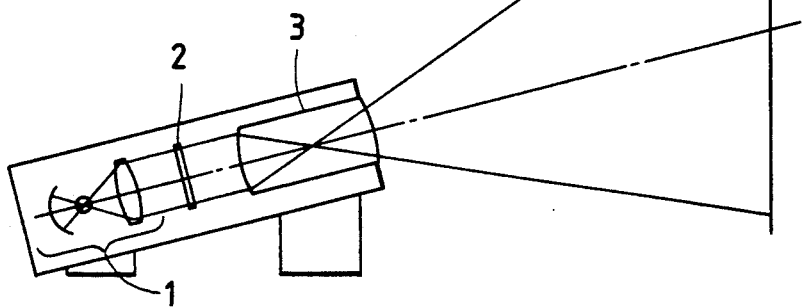
FIG. 8 is a view of a conventional projection display apparatus.

FIG. 1 shows a basic composition of an embodiment of a projection display apparatus of the present invention. Referring to FIG. 1, the projection display apparatus is constituted by an illumination optical system 1, a display panel 2, such as a liquid crystal light valve, a projection lens 3 and a screen 4 in the same manner as the conventional apparatus shown in FIG. 8. The illumination optical system 1 is, as shown in FIG. 1, constituted by a light source, such as a halogen lamp, a reflective mirror and a lens system for condensing light from the light source, and so on. A bundle of rays from the illumination optical system 1 are lead to the display panel 2 for displaying an image based on image information, such as video signals, and then the image on the display panel 2 is projected with magnification by the projection lens 3 onto the screen 4. In this case, it should be noted that the screen 4 on which the image is projected is disposed on the tilt with respect to the optical axis of the projection lens 3. In a conventional system, the tilt causes trapezium distortion in an image projected onto the screen.

The embodiment of the present invention shown in FIG. 1 is different from the conventional apparatus in having a compensating optical system 5 mounted in the projection lens 3 and a drive device 6 for decentering the compensating optical system 5 in parallel to the direction perpendicular to the optical axis of the projection lens 3. The present invention is characterized in that it intentionally produces decentering distortion and compensates for trapezium distortion by decentering the compensating optical system 5.

Figure 2:
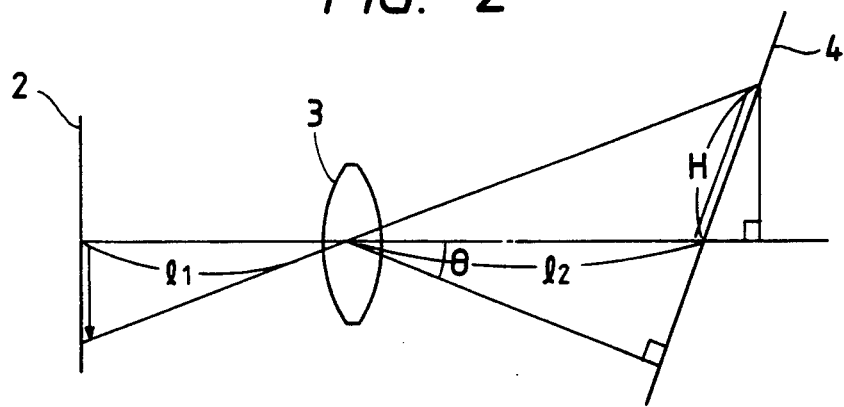
FIG. 2 is a view explaining the principle that trapezium distortion is caused by tilt.
Figure 3A:
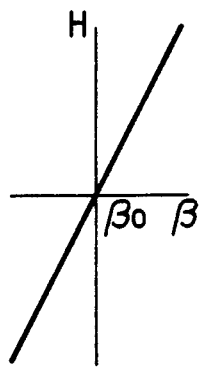
FIGS. 3A to 3C are views explaining the compensation principle of the present invention;
(a) a view showing the relationship between the height H of a screen and magnification $\beta$
(b) a view showing trapezium distortion caused
(c) a view showing decentering distortion D produced for compensating the trapezium distortion

The principle of compensation according to the present invention will now be described with reference to FIGS. 2 through 4. FIG. 2 is a view illustrating how trapezium distortion is caused by tilt projection. An image (the arrow shown in FIG. 2) formed on the display panel 2 is projected on the tilt of the angle $\theta$ onto the screen 4 by the projection lens 3. It is well known that the relationship between an object and an image thus arranged arises in swing and tilt photography and so on. It is assumed that the distance between the display panel 2 and the principal point of the projection lens 3 on the side of the display panel 2 is $l_1$, the distance between the principal point of the projection lens 3 on the side of the screen 4 and the H screen 4 is $l_2$, and the origin of the screen 4 is an intersecting point of the optical axis of the projection lens 3 and the screen 4. As shown in the section capable of observing the tilt of $\theta$ in FIG. 2, the projection magnification $\beta$ in the case when the screen 4 has the height of H can be easily found by calculation of a paraxial ray as follows:

$$\beta = (l_2 + H\sin\theta)/l_1 \qquad (1)$$
$$= \beta_0 + (\sin\theta/l_1)H$$

wherein $\beta_0$ represents the projection magnification at the origin of the screen 4. The equation (1) reveals that the projection magnification $\beta$ on the screen 4 is a linear function with respect to the vertical height H of the screen 4. This relationship is peculiar to the tilt, and if $\theta$ is 0, the magnification $\beta$ always equals $\beta_0$. The relationship between $\beta$ and H of the present invention in the case that $\theta \neq 0$ is as shown in FIG. 3A. If H is positive (in the upper part of the figure), the magnification is higher than that of the center portion, and if H is negative, the magnification is opposite to the above. As a result, if a square image is input to the display panel 2, the image formed on the screen 4 is distorted into a trapezoid as shown by the solid line in FIG. 3B. A dotted line in the figure shows the image without distortion.

Figure 3B:
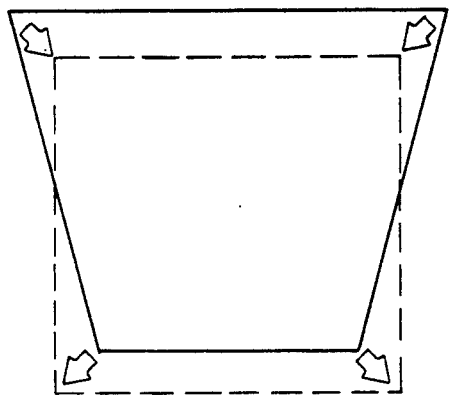
Figure 3C:
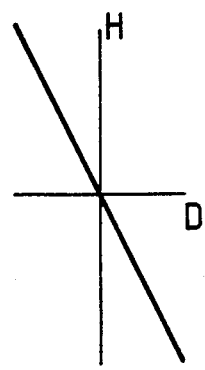

In order to compensate for trapezium distortion caused by, so to speak, the arrangement of the optical system itself, it is necessary only to produce decentering distortion in the direction shown by the arrows in FIG. 3B, that is decentering distortion D as shown in FIG. 3C. Since this distortion does not have a shape symmetric with respect to the optical axis, it is not of a kind which a normal coaxial system can produce. The first embodiment of the present invention produces the distortion D by decentering the compensating optical system 5 by the drive device 6 from the optical axis of the projection lens 3.

Figure 4:
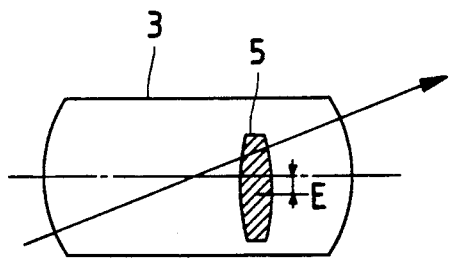
FIG. 4 is a view showing a method of producing the decentering distortion by parallel decentering.

FIG. 4 shows the first embodiment in which decentering distortion is produced by parallel decentering. Although the projection lens 3 comprises the compensating optical system 5 as shown in FIG. 1, the compensating optical system 5 is vertically decentered in parallel by the amount E by the drive device 6. The decentering distortion D produced in this case is represented in consideration of the three-order terms as follows:

$$D = -(E/2)(\tan\omega)^2[3(VE_1)-(VE_2)] \qquad (2)$$

wherein $\tan\omega = H/f$ and f represents the focal length of the whole system of the projection lens 3. $VE_1$ and $VE_2$ in the equation (2) represent parallel decentering distortion coefficients of the compensating optical system 5 and are found as follows:

$$VE_1 = (h\phi V_q - aV_p) - (\bar{h}\phi III_q \bar{a} III_p)$$
$$VE_2 = \bar{h}\phi p_q - \bar{a} P_p \qquad (3)$$

wherein $\omega$, $V_p$, $III_p$ and $P_p$ represent refracting power, three-order distortion, astigmatism coefficient and Petzval's sum of the compensating optical system 5 respectively. Furthermore, $V_q$, $III_q$ and $P_q$ represent three-order distortion, astigmatism coefficient and Petzval's sum of the optical system on the side of the screen from the compensating optical system respectively, h and a represent incident height and angle of a paraxial object ray into the compensating optical system 5, and $\bar{h}$ and $\bar{a}$ represent incident height and angle of a paraxial pupil ray into the compensating optical system 5.

Since the distortion when the compensating optical system is decentered is calculated in the above procedures, in order to preform the compensation shown in FIG. 3B, the compensating optical system is decentered in parallel so that the shift in image caused by any difference in projection magnification in accordance with the height H and the decentering distortion D counterbalance. In other words, trapezium distortion can be compensated in up to three-order regions if:

$$D = (-\beta/\beta_0 + 1) \cdot H \qquad (4)$$

The parallel decentering amount E of the compensating optical system can be found with the equations (1) to (4). When the compensation shown in FIG. 3B is performed, if the compensating optical system 5 is a convex lens, it is decentered downward by a predetermined amount, and if the compensating optical system 5 is a concave lens, it is decentered upward.

The case in which the tilt direction of the projection lens 3 is limited to a perpendicular direction is possible as a variation of the first embodiment. In an overwhelming majority of real cases, a projection lens moves only in a vertical (i.e. up and down) direction. In these cases, since the trapezium distortion is caused by the tilt only in a vertical direction, it is sufficient to produce decentering distortion for compensation only in a vertical direction. Furthermore, there may be provided another embodiment, in which a part of the projection lens 3 is composed of a cylindrical lens having curvature in the vertical direction and a cylindrical lens having curvature in the right and left direction with only the cylindrical lens having curvature in the vertical direction being vertically decentered in parallel.

Figure 5:
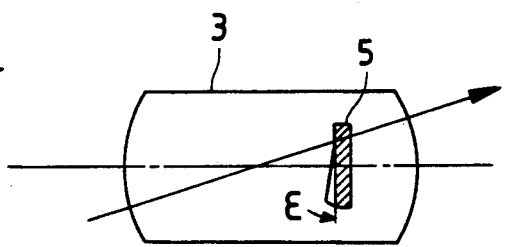
FIG. 5 is a view showing a method of producing the decentering distortion by oblique decentering.

FIG. 5 shows the principle of a second embodiment of the present invention. The second embodiment is different from the first embodiment in using a variable vertical angle prism inserted into a projection lens as a compensating optical system for compensating trapezium distortion instead of performing parallel decentering. By changing the vertical angle c of the variable vertical angle prism and applying tilt decentering to the optical system, it is possible to produce decentering distortion in the same manner as the case in which the parallel decentering is performed. The decentering distortion D produced in this case is calculated in consideration of three-order terms as follows:

$$D = -(\epsilon/2)(\tan\omega)^2[3(V\epsilon_1)-(V\epsilon_2)] \qquad (5)$$

wherein $V\epsilon_1$ and $V\epsilon_2$ represent tilt decentering distortion coefficients of the compensating optical system. For example, if the prism on the side of the display panel is decentered, these two coefficients are shown as follows:

$$V\epsilon_1 = h[(N-1)V_q - V_p] - \bar{h}[(N-1)III_q - III_p] + (\bar{a}\cdot/N - \bar{a})$$
$$V\epsilon_2 = \bar{h}[(N-1)P_q - P_p] + (\bar{a}\cdot/N - \bar{a}) \qquad (6)$$

wherein N represents the refractive index of the variable vertical angle prism and $\bar{a}$ represents the outgoing angle of a paraxial pupil ray passing through the variable vertical angle prism. According to the equations (5) and (6), the tilt decentering amount $\epsilon$ for compensating trapezium distortion can be found in the same manner as in the case of parallel decentering. In order to perform the compensation shown in FIG. 3B, the drive device 6 is driven so that the upper base of the variable vertical angle prism is narrower than the lower base.

Figure 6:
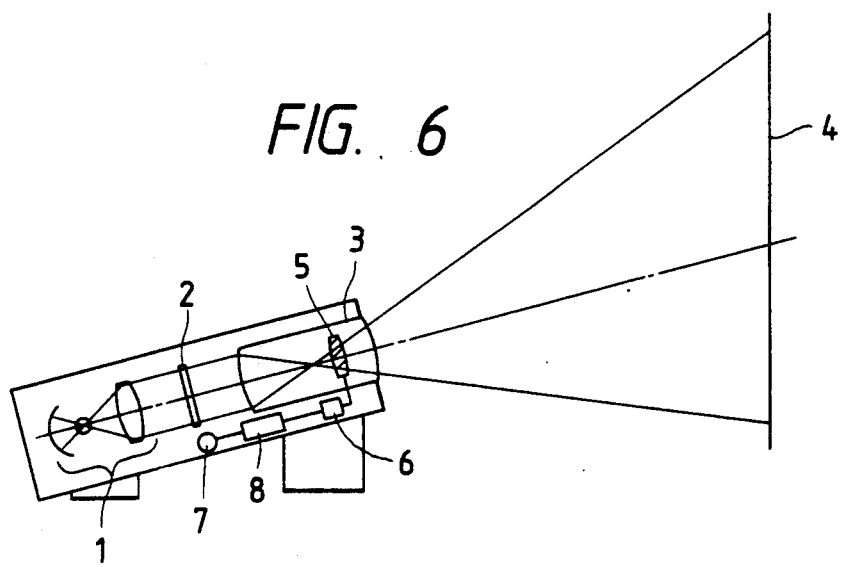
FIG. 6 is a view of an embodiment provided with an automatic compensation mechanism for trapezium distortion.

FIG. 6 shows the composition of an embodiment of a system for automatically compensating trapezium distortion in accordance with tilt by using the optical system of the present invention. Referring to FIG. 6, a detection means 7 for detecting the tilt angle of the whole projection display apparatus is added to the system shown in FIG. 1. A circuit 8 determines the drive amount of some lenses in the projection lens according to the output of the tilt detection means 7, and the lenses are moved through the drive device 6 based on the output of the circuit 8 so as to compensate for trapezium distortion. The circuit 8 comprises a microprocessor including a ROM, for previously storing a plurality of compensating drive amounts in accordance with the tilt degree, and so on. In most general cases, the screen 4 is disposed perpendicularly to the ground. If the detection means 7 detects the tilt degree of the projection display apparatus, it is possible to know the tilt degree of the optical axis of the projection lens 3 with respect to the screen 4. As a result, the amount of trapezium distortion is calculated, and then the drive device 6 moves the compensating lens 5 by the drive amount determined by the circuit 8 and automatically compensates the trapezium distortion in accordance with the tilt degree. When the tilt degree of the screen is previously known, an offset process can be performed.

It is natural that such a compensation can be applied to the method of tilt decentering shown in FIG. 5, as well as to the method of parallel decentering shown in FIG. 4.

Figure 7:
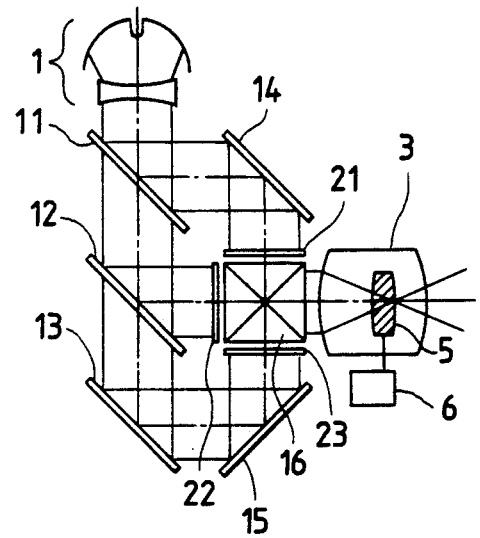
FIG. 7 is a view of an embodiment in which the present invention is applied to a full-color display.

FIG. 7 shows an embodiment in which the present invention is applied to a full-color display for separating an illumination light into beams of three colors, leading the beams to liquid crystal panels respectively for R, G and B, and synthesizing the beams again. A light from a light source is divided into two beams by a dichroic mirror 11 which reflects only blue light. A dichroic mirror 12 reflects only green light from red and green lights passing through the dichroic mirror 11, and a cold mirror 13 lets infrared light pass therethrough and reflects red light. 14 and 15 denote total reflection mirrors. The lights thus separated into three colors respectively come into liquid crystal display panels 21, 22 and 23, each corresponding to one color, and image signal information which is coded in accordance with each color is obtained. The information is synthesized by a three color synthesizing prism 16, and projected onto the screen through the projection lens 3. Since the liquid crystal display panels of three colors are optically in the same position with respect to the projection lens 3, they are similarly influenced by the tilt. Therefore, the compensation of trapezium distortion by decentering of the present invention is commonly effective for each color.

The embodiment will be described below based on specific lens data on lenses shown in FIG. 9. In numerical values of the embodiment, Ri represents the radius of curvature of the ith lens from the panel, Di represents the thickness and air interval of the ith lens from the panel, and Ni and Vi represent the glass refractive index and Abbe number of the ith lens from the panel respectively.

| R1 = 164.48982 | D1 = 11.20 | N1 = 1.693501 | v1 = 53.23 | G1 |
| R2 = −187.41620 | D2 = 0.15 | N2 = 1.712995 | v2 = 53.84 | G2 |

-continued

| R3 = 48.82848 | D3 = 10.60 | N3 = 1.693501 | v3 = 53.23 | G3 |
| R4 = 97.82147 | D4 = 0.15 | N4 = 1.728249 | v4 = 28.46 | G4 |
| R5 = 45.68793 | D5 = 10.80 | N5 = 1.698947 | v5 = 30.12 | G5 |
| R6 = 88.23173 | D6 = 1.70 | N6 = 1.806098 | v6 = 40.95 | G6 |
| R7 = 146.12539 | D7 = 4.40 | | | |
| R8 = 24.25206 | D8 = 27.60 | | | |
| R9 = aperture | D9 = 16.35 | | | |
| R10 = −53.81325 | D10 = 1.80 | | | |
| R11 = ∞ | D11 = 2.30 | | | |
| R12 = ∞ | D12 = 6.70 | | | |
| R13 = −44.44294 | | | | |

Figure 9:
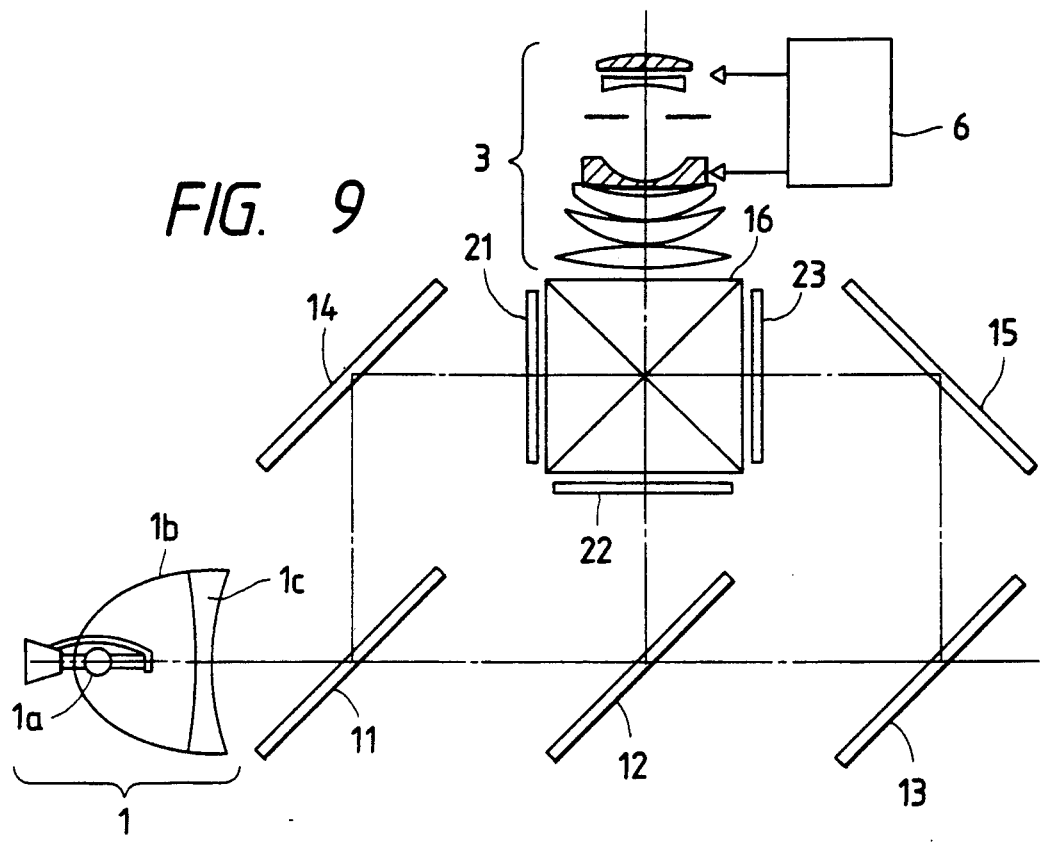
FIGS. 9 and 10 are views showing the composition of an embodiment of the projection display apparatus according to the present invention.
Figure 10:
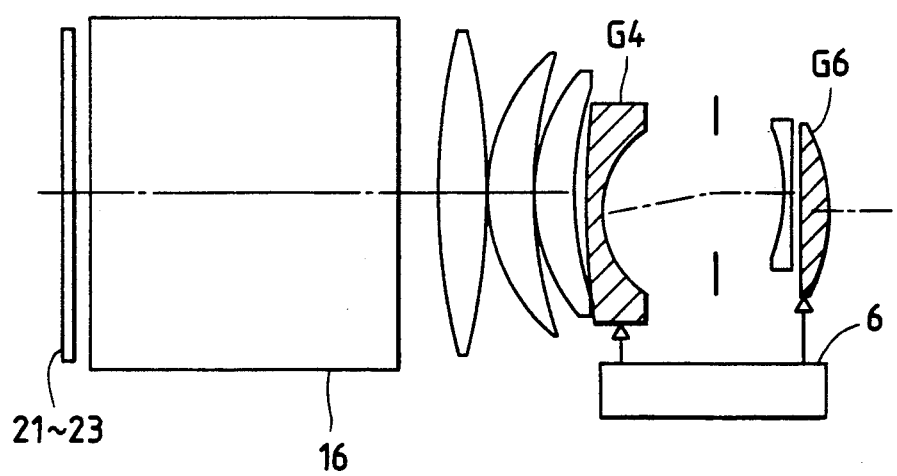

In this embodiment, as shown in FIG. 9 or 10, decentering distortion is produced by decentering lenses G4 and G6 in the projection lens 3 in parallel by the decentering drive means 6 in the ratio of 5:4 (the ratio of movement amount) and trapezium distortion is compensated. Gi represents the ith lens from the panels 21 through 23.

The amount of the distortion produced by the parallel decentering D is found from the above equation (2) according to decentering distortion theory. Decentering distortion coefficient of each lens is as follows:

TABLE 1

Decentering Distortion, Coefficient of Projection lens (Magnification ×20 on Screen)

| | $VE_1$ | $VE_2$ | $3VE_1-VE_2$ |
|---|---|---|---|
| G1 | −0.320 | 0.410 | −1.370 |
| G2 | 0.530 | 0.990 | 0.600 |
| G3 | 1.804 | 1.522 | 3.890 |
| G4 | −2.304 | −3.219 | −3.693 |
| G5 | 0.388 | −1.395 | 2.559 |
| G6 | −0.296 | 1.736 | −2.624 |
| whole system | −0.200 | 0.044 | −0.644 |

In order to perfectly compensate trapezium distortion found from the equation (1), this embodiment produces distortion by decentering the lenses G4 and G6 whose decentering distortion coefficients have the biggest negative values. For example, if $\theta = 15°$, the G4 lens and the G6 lens only have to be decentered by approximately 10 mm and approximately 8 mm respectively.

In general, although the origin of the image is moved on the screen by decentering the lens and the effect of the tilt projection of the image is offset in this case, since the lenses G4 and G6 are decentered in the ratio of 5:4 (the ratio of movement amount), the origin is hardly moved and a tilt projection can be performed. The amount of movement of the origin on the screen S is shown as follows:

$$S = E\beta_q(1-\beta_p)$$

wherein $\beta_p$ represents magnification of the lens to be decentered and $\beta_q$ represents magnification of the lens system disposed on the side of the screen from the lens to be decentered.

Table 2 shows values of $\beta_p$, $\beta_q$ and $\beta_q(1-\beta_p)$ in the case in which the lenses G6 and G4 are decentered in the ratio of 5:4 in the present embodiment. As shown in Tables 1 and 2, in the present embodiment, the lens F4 produces an especially large distortion coefficient and compensates trapezium distortion, and the lens G6 has the highest sensitivity and compensates so as to reduce the amount of movement of the origin caused by the lens G4.

TABLE 2

| | \$\beta_p\$ and \$\beta_q\$ of Projection Lens (Magnification ×20 on Screen) | | |
|---|---|---|---|
| | \$\beta_p\$ | \$\beta_q\$ | \$\beta_q (1-\beta_p)\$ |
| G1 | 2.697 | −7.415 | 12.583 |
| G2 | −1.396 | 5.310 | 12.723 |
| G3 | 0.295 | 17.981 | 12.677 |
| G4 | −1.357 | −13.252 | −31.235 |
| G5 | 0.356 | −37.176 | −23.941 |
| G6 | −37.176 | 1 | 38.176 |
| whole system | −20 | 1 | 21 |
| 5 × G4 + 4 × G6 | — | — | −3.471 |

As described above, the present embodiment compensates trapezium distortion by decentering two lenses in the projection lens in parallel in a predetermined ratio so that decentering distortion is produced in the same direction and the sensitivity of movement of the origin is offset.

Although, in this embodiment, when the projection angle of the lenses G4 and G6 in the projection lens 3 is the angle of 15°, trapezium distortion is compensated by decentering the lenses in the ratio of 5:4 in parallel. The trapezium distortion may be compensated in other compositions, for example, in the combination of tilt decentering and parallel decentering in some lenses.

When distortion is produced by decentering, although astigmatism and coma area are also produced and deteriorate imaging performance, it is possible to compensate and minimize the deterioration by decentering other lenses.

If the up, down, right and left tilt degrees between the apparatus and the screen are found, for example, by measuring the distance between a plurality of points on the screen and the display panel, and if the decentering amount of each lens in accordance with the tilt angle is calculated by a microprocessor or the like, the trapezium distortion can be automatically compensated.

As described above, according to the present invention, in a projection display apparatus for projecting an image on a display panel onto a screen, a drive means for decentering some lenses in a projection lens is disposed, and even if a bundle of rays from the projection lens are projected on the tilt with respect to the screen, decentering distortion is produced by decentering some lenses in the projection lens. Therefore, it is possible to prevent distortion from being caused as much as possible.

The above embodiments compensate trapezium distortion of an image caused when the whole projection apparatus tilts with respect to the screen.

An embodiment in which an image is decentered by decentering at least some lenses in a projection lens when the projection apparatus and the screen are arranged in parallel will be described below. Even if the projection apparatus and the screen are positioned in parallel, the screen is not always in a desired position and it is difficult to position an image to be projected and the screen in a desired relation. However, in this embodiment, when an image is moved on a screen desirably positioned, decentering distortion caused by decentering can be minimized and the image can be moved by a large amount by moving the lens by a small amount.

Furthermore, the lens G6, which is the nearest to the screen, has a small diameter and a sensitivity $\beta_q$ relative to the movement of origin larger than that of the whole system, and is decentered in parallel so as to shift the image up and down or right and left on the screen.

Therefore, for example, if the lens G6 is decentered in parallel by 10 mm when an image magnified by 20 is projected onto a screen, the image is shifted by 381.76 mm on the screen. If an image is shifted by the same amount as the above by decentering the whole projection lens system in parallel, then when the projection lens of the present invention is used, about twice as much decentering as the above is necessary.

Figure 11:
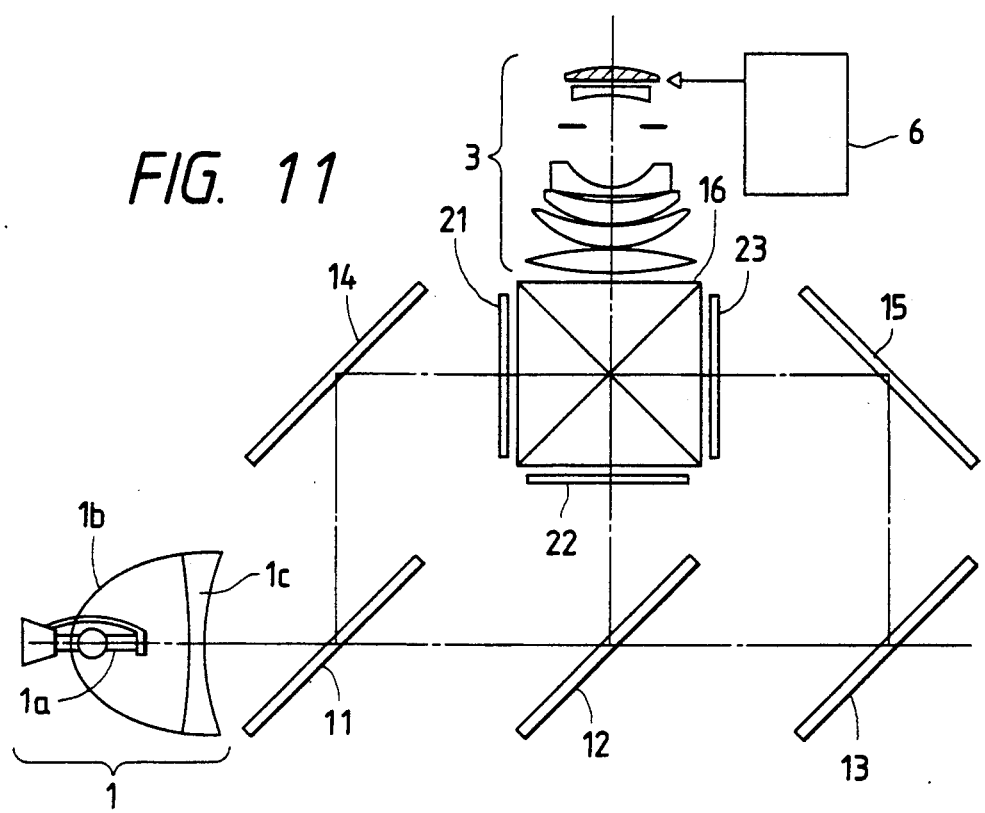
FIG. 11 is a view showing the composition of the embodiment.
Figure 12:
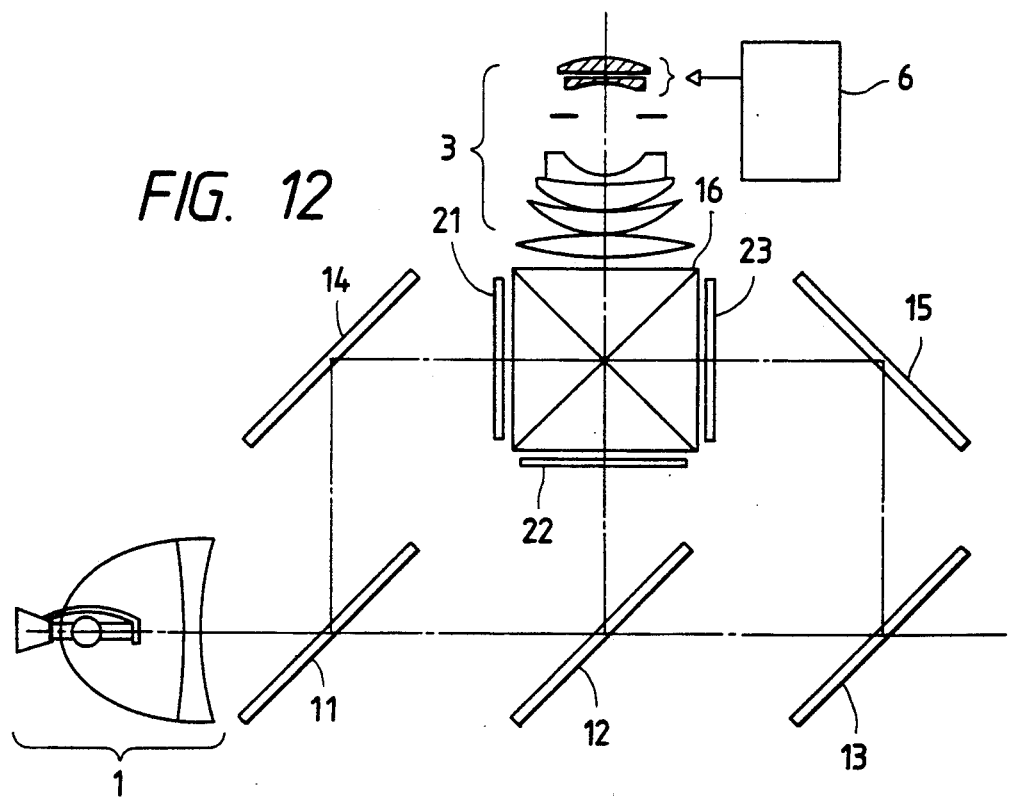
FIG. 12 is a view showing the composition of another embodiment of the projection display apparatus according to the present invention.

FIGS. 11 and 12 show another embodiment of a projection display apparatus of the present invention. In this embodiment, an image is shifted up and down or right and left on a screen by decentering the lenses G5 and G6 in the projection lens 3 together in parallel. In general, when the image is shifted on the screen, the image is distorted. The amount D of distortion produced by the parallel decentering is shown as follows according to the three-color decentering distortion theory as described above.

$$D = -\frac{E}{2}(\tan\omega)^2 [3VE_1 - VE_2]$$

In this embodiment, for example, if the lenses G5 and G6 are decentered by 10 mm in parallel together, the image is shifted by 142.35 mm on the screen, the distortion of the image is compensated, and as a result, an image with almost no distortion can be obtained.

Furthermore, if the image is shifted, as astigmatism and coma are caused by decentering, imaging performance is deteriorated. However, it is possible to reduce the deterioration of the imaging performance by another composition, for example, by decentering a plurality of lenses by amounts having different ratios.

Since the sensitivity with respect to shifting and the decentering distortion coefficient of the projection lens vary in accordance with the magnification by which the image is projected onto the screen, a decentering method may be changed in accordance with the magnification, or in accordance with focal length where a zoom lens is used as the projection lens.

According to the present invention as described above, in a projection display apparatus for projecting an image on a display panel onto a screen, some lenses in a projection lens are decentered in parallel in the direction substantially perpendicular to the optical axis. Therefore, the image on the screen can be shifted to an optimal position without making the diameter of the lens longer than necessary, and since the lens to be decentered is light, operability is enhanced.

What is claimed is:

1. A projection apparatus for projecting an image onto a screen, comprising:
   image forming means for forming an image;
   projection lens means, having a plurality of lenses and an optical axis, for projecting the image formed by said image forming means onto the screen; and
   decentering means for decentering at least two selected lenses in said projection lens means with respect to the optical axis.

2. A projection apparatus according to claim 1, further comprising:
   detection means for detecting a tilt angle of the screen with respect to the optical axis of said projection lens means,
   wherein said decentering means decenters said selected lenses based on the detection results of said detection means.

3. A projection apparatus according to claim 1, wherein said decentering means decenters at least two lenses in said projection lens means by different amounts.

4. A projection apparatus according to claim 3, wherein decentering distortion coefficients of said two lenses have the same sign.

5. A projection apparatus according to claim 1, wherein said selected lenses decentered by said decentering means comprise a positive power lens and a negative power lens.

6. A projection apparatus for projecting an image onto a screen, comprising:
   image forming means for forming an image;
   projection lens means, having an optical axis, emitting a bundle of rays for projecting the image formed by said image forming means onto the screen; and
   a variable refraction angle prism for changing the angle of refraction of the bundle of rays emitted from said projection lens means.

7. A projection apparatus according to claim 6, wherein said positive power lens and said negative power lens are decentered by different amounts.

8. An apparatus for projecting an image to a screen comprising:
   a plurality of image forming means for producing the image;
   optical means for synthesizing light flux produced by each of said plurality of image forming means;
   projection lens means, having an optical axis and including a plurality of lenses, for projecting the synthesized image generated by said optical means toward the screen; and
   means for decentering at least two selected lenses of said projection lens means.

9. An apparatus according to claim 8, wherein two lenses are decentered by said decentering means and one of said two lenses is located at a position closer to the screen than said other lenses.

10. An apparatus according to claim 8, wherein said selected lenses decentered by said decentering means include a positive power lens and a negative power lens.

11. An apparatus according to claim 8, wherein two lenses are decentered by said decentering means and decentering distortion coefficients of said two lenses have the same sign.

* * * * *

UNITED STATES PATENT AND TRADEMARK OFFICE
CERTIFICATE OF CORRECTION

PATENT NO. : 5,096,288
DATED : March 17, 1992
INVENTOR(S) : Koutaro Yano, et al.

It is certified that error appears in the above-identified patent and that said Letters Patent is hereby corrected as shown below:

ON THE TITLE PAGE:

[30] FOREIGN APPLICATION PRIORITY DATA:

"Sep. 19, 1989 [JP] Japan....... 1-251280" should read
--Sep. 27, 1989 [JP] Japan ........ 1-251280--.

[56] REFERENCES CITED:

FOREIGN PATENT DOCUMENTS, "5/1988" should read --3/1988--.

COLUMN 2:

Line 39, "disposed on the tilt" should read --tilted--.
Line 66, "H" should be deleted.

COLUMN 3:

Line 54, "$VE_1 = (h\phi V_q - aV_p) - (\overline{h}\phi III_q \overline{a}III_p)$" should read --$VE_1 = (h\phi V_q - aV_p) - (\overline{h}\phi III_q - \overline{a}III_p)$--.

Line 58, "wherein $\omega$," should read --wherein $\phi$,--.

COLUMN 4:

Line 41, "angle c" should read --angle $\epsilon$--.

UNITED STATES PATENT AND TRADEMARK OFFICE
CERTIFICATE OF CORRECTION

PATENT NO. : 5,096,288
DATED : March 17, 1992
INVENTOR(S) : Koutaro Yano, et al.

It is certified that error appears in the above-identified patent and that said Letters Patent is hereby corrected as shown below:

<u>COLUMN 7</u>:

Line 62, "by" (first and third occurrences) should be deleted.

Signed and Sealed this

Thirty-first Day of August, 1993

*Attest:*

BRUCE LEHMAN

*Attesting Officer*     *Commissioner of Patents and Trademarks*